United States Patent
Kim et al.

(10) Patent No.: US 8,526,505 B2
(45) Date of Patent: Sep. 3, 2013

(54) SYSTEM AND METHOD FOR TRANSMITTING DIGITAL VIDEO STREAM USING SVC SCHEME

(75) Inventors: Han-Sang Kim, Seoul (KR); Kwan-Woong Song, Seongnam-si (KR); Young-Hun Joo, Yongin-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1571 days.

(21) Appl. No.: 11/523,510

(22) Filed: Sep. 19, 2006

(65) Prior Publication Data

US 2007/0116129 A1 May 24, 2007

(30) Foreign Application Priority Data

Nov. 22, 2005 (KR) .......................... 10-2005-0112057

(51) Int. Cl.
*H04N 7/12* (2006.01)
(52) U.S. Cl.
USPC .................................................... 375/240.26
(58) Field of Classification Search
USPC ............................. 375/240.26; 374/240.01
IPC ....................................................... H04N 7/12
See application file for complete search history.

(56) References Cited

U.S. PATENT DOCUMENTS

| | | | | |
|---|---|---|---|---|
| 5,408,473 A | * | 4/1995 | Hutchison et al. | ............ 370/506 |
| 5,742,343 A | * | 4/1998 | Haskell et al. | ........... 375/240.15 |
| 7,010,043 B2 | * | 3/2006 | Kerofsky et al. | ......... 375/240.19 |
| 2004/0196902 A1 | * | 10/2004 | Faroudja | ................... 375/240.1 |

FOREIGN PATENT DOCUMENTS

KR 2005-032113 4/2005

* cited by examiner

*Primary Examiner* — David Czekaj
*Assistant Examiner* — Tracy Li
(74) *Attorney, Agent, or Firm* — Cha + Reiter, LLC.

(57) ABSTRACT

Disclosed is a system for transmitting a digital video stream, which supports decoding of a scalable video coding (SVC) scheme, the system includes a transmission terminal and a reception terminal, wherein the transmission terminal includes an encoder for encoding a high-definition digital video stream and a division transmission unit for dividing the high-definition video stream having a predetermined time unit into a first divided high-definition video stream and a second divided high-definition video stream by reducing a frame rate and for transmitting the first and second divided high-definition video streams, and the reception terminal includes a transmission coupling unit for receiving the first and second divided high-definition video streams transmitted from the transmission terminal, coupling the received streams according to validity thereof, and transmitting the received streams as a reception high-definition digital video stream; and a decoder for decoding the reception high-definition digital video stream transmitted from the transmission coupling unit.

9 Claims, 9 Drawing Sheets

METHOD OF PRESENT INVENTION

SYSTEM AND METHOD FOR TRANSMITTING DIGITAL VIDEO STREAM USING SVC SCHEME

CLAIM OF PRIORITY

This application claims the benefit of the earlier filing date, under 35 U.S.C. 119(a), to that patent application entitled "System And Method For Transmitting Digital Video Stream Using SVC Scheme," filed in the Korean Intellectual Property Office on Nov. 22, 2005 and assigned Serial No. 2005-112057, the entire contents of which are incorporated herein by reference.

BACKGROUND OF THE INVENTION

1. Field of the Invention

The present invention relates to a scalable video coding (SVC) scheme in digital broadcasting, and more particularly to a method for stably transmitting a high-definition image by utilizing redundant resources in a wireless transmission environment.

2. Description of the Related Art

In general, wireless transmission of digital video streams is performed by using a limited resource (i.e. bandwidth). For such wireless transmission, a bursty environment is likely to cause a loss of transmitted data and is thus a factor that should be overcome.

FIG. 1 is a block diagram illustrating a conventional transmission environment for a digital video stream.

The conventional transmission environment for a digital video stream includes an encoder 11 for encoding and transmitting a high-definition digital video stream, a bursty wireless transmission medium 100 for transmitting a high-definition video stream, and a decoder 12 for receiving and decoding received high-definition digital video stream. Although the details of a transmission device and a reception device are not shown in FIG. 1, the constructions of these devices is well known to those skilled in the art and need not be discussed herein.

The term "bursty wireless environment" means a wireless environment in which data may momentarily crowd together. Such a bursty wireless environment may cause a burst error representing a loss of unspecified data. Such a burst error is an important consideration factor for multimedia data in which continuity of data is very important.

In order to transmit a high-definition digital video stream, which is related to the present invention, in such a bursty wireless environment, characteristics or features such as a wide bandwidth to ensure a high bit rate and error recovery for lost data, which may be caused in the bursty error environment must be provided.

With respect to the wide bandwidth to ensure a high bit rate, various compression methods have been proposed in order to overcome limited bandwidth resources. However, there is a limitation in ensuring bandwidths by such compression methods. Therefore, it is necessary to develop a method capable of more efficiently allocating and ensuring bandwidths.

With respect to error recovery, various methods, such as a re-transmission method, an interleaving method, a forward error correction (FEC) method, etc., have been applied. However, such applications are problematic in that they cannot always treat (heal; overcome; solve) an error. It is difficult to instantly predict the network environment and is thus difficult to predict an occurrence of error in the bursty wireless environment, and because it is necessary to install a large-capacity buffer at a terminal of the system in order to process images without interruption when a video stream having a high bit rate is transmitted.

SUMMARY OF THE INVENTION

Accordingly, the present invention has been made to solve the above-mentioned problems occurring in the prior art and provides additional advantages, by providing a system and method for transmitting a digital video stream using a scalable video coding (SVC) scheme, by which it is possible to transmit a high-definition digital video stream without interruption in a bursty wireless environment.

Another aspect of the present invention is to provide a system and method which can reduce transmission bandwidth when a high-definition digital video stream is transmitted.

In accordance with another aspect of the present invention, there is provided a system for transmitting a digital video stream, which supports decoding of a scalable video coding (SVC) scheme, the system including a transmission terminal and a reception terminal, wherein the transmission terminal includes an encoder for encoding a high-definition digital video stream, and a division transmission unit for dividing the high-definition video stream having a predetermined time unit, which has been encoded by the encoder, into a first divided high-definition video stream and a second divided high-definition video stream by reducing a frame rate to a known level, and for transmitting the first and second divided high-definition video streams, and the reception terminal includes a transmission coupling unit for receiving the first and second divided high-definition video streams transmitted from the transmission terminal, coupling the received streams according to validity thereof, and transmitting the received streams as a reception high-definition digital video stream, and a decoder for decoding the reception high-definition digital video stream transmitted from the transmission coupling unit.

In accordance with another aspect of the present invention, there is provided a method for transmitting a digital video stream, which supports decoding of a scalable video coding (SVC) scheme, the method including the steps of: a) encoding a high-definition digital video stream, b) dividing the high-definition video stream having a predetermined time unit into a first divided high-definition video stream and a second divided high-definition video stream by reducing a frame rate, and transmitting the first and second divided high-definition video streams, c) receiving the first and second divided high-definition video streams, coupling the received streams according to validity thereof, and generating a reception high-definition digital video stream, and d) decoding the reception high-definition digital video stream.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Hereinafter, an embodiment of the present invention will be described with reference to the accompanying drawings. For the purposes of clarity and simplicity, a detailed description of known functions and configurations incorporated herein will be omitted as it may obscure the subject matter of the present invention.

Each high-definition digital video stream has a high frame rate where frame includes a large number of pixels, and, hence, a large amount of data per second. In order to transmit such a large amount of data, a wide bandwidth is required.

When such a large amount of data requiring a wide bandwidth is transmitted through a network having a bursty wireless environment, an error or data loss may occur because a channel bandwidth is not fixed but changes every moment.

Therefore, the present invention proposes a method which employs a scalable video coding (SVC) scheme for transmitting data in different bit rates depending on network environments, and can cope with a network bandwidth change acting as a limitation factor of the SVC scheme.

Figure 2:
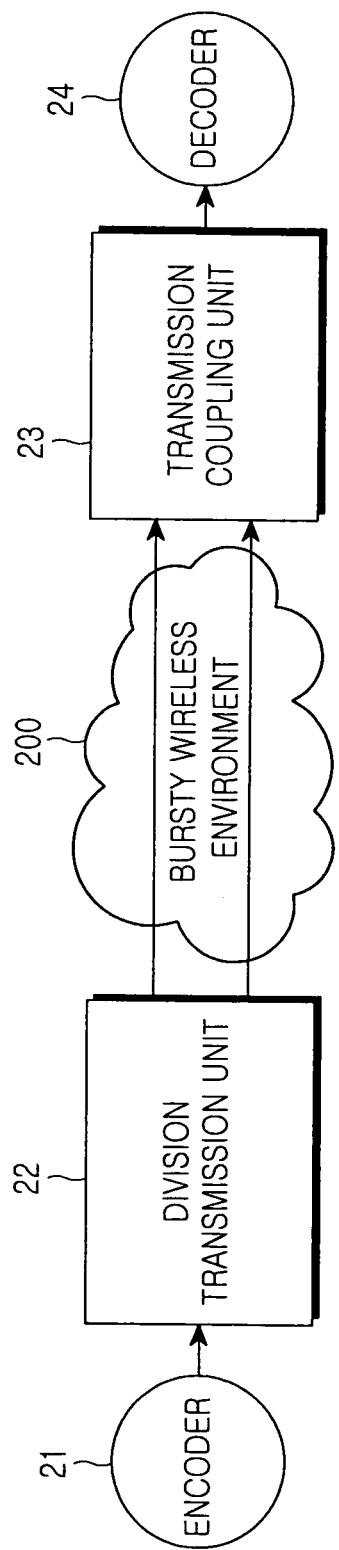
FIG. 2 is a block diagram illustrating a digital video stream transmission system employing the SVC scheme according to an embodiment of the present invention.

FIG. 2 is a block diagram illustrating the construction of a digital video stream transmission system employing the SVC scheme according to an embodiment of the present invention.

A digital video stream transmission system employing the SVC according to the present invention includes an encoder 21 for encoding and transmitting a high-definition digital video stream, a division transmission unit 22 for dividing and transmitting the encoded high-definition digital video stream, a bursty wireless transmission environment 200 to transmit the divided high-definition digital video stream, a transmission coupling unit 23 for coupling the divided high-definition digital video stream which has been received through the bursty wireless environment 200, and a decoder 24 for decoding a high-definition digital video stream which has been coupled through the transmission coupling unit 23.

Figure 1:
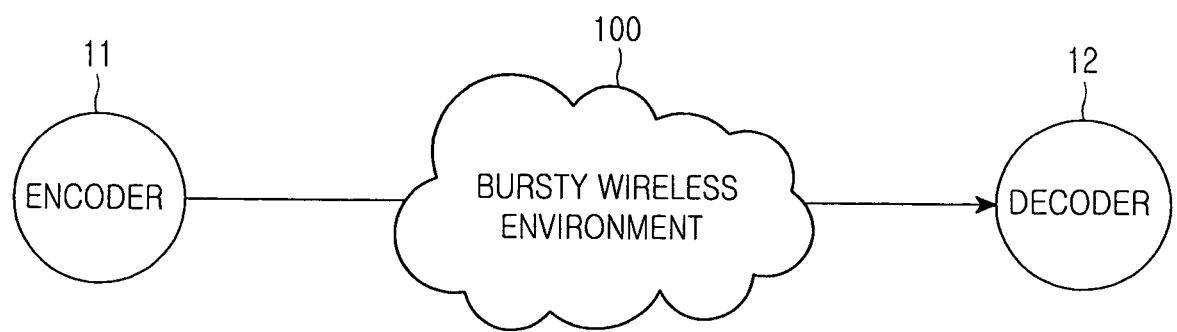
FIG. 1 is a block diagram illustrating a conventional transmission environment for a digital video stream.

As shown in FIG. 2, the digital video stream transmission system employing the SVC scheme according to an embodiment of the present invention further includes the division transmission unit 22 in addition to the encoder 21, and further includes the transmission coupling unit 23 in addition to the decoder 24, as compared with the conventional system shown in FIG. 1.

The division transmission unit 22 divides a high-definition digital video stream input through the encoder 21 into two streams D1 and D2 so as to reduce a frame rate per second to one-half, and transmits the divided streams through the bursty wireless environment 200 at the same time.

The transmission coupling unit 23 receives the streams D1 and D2, which have been separately transmitted through the bursty wireless environment 200, checks whether each received stream is correct (i.e. an error has occurred), couples the received streams, and transmits the coupled streams to the decoder 24.

The digital video stream transmission system employing the SVC scheme according to the present invention provides two specific features, as compared with the conventional digital video stream transmission system.

First, according to the digital video stream transmission system according to the present invention, a digital video stream is divided into two halves thereof, each of which is then transmitted in a predetermined time unit, thereby reducing the frame rate per second to one-half, so that it is possible to reduce the bandwidth.

Secondly, divided digital video streams are simultaneously transmitted through different frequencies, so that it is possible to prevent digital video streams from being completely lost in the bursty wireless environment. According to such a transmission method of the present invention, since digital video streams are prevented from being completely lost, interruption of continuous images is prevented by the SVC scheme although screen quality may be deteriorated.

Figure 3A:
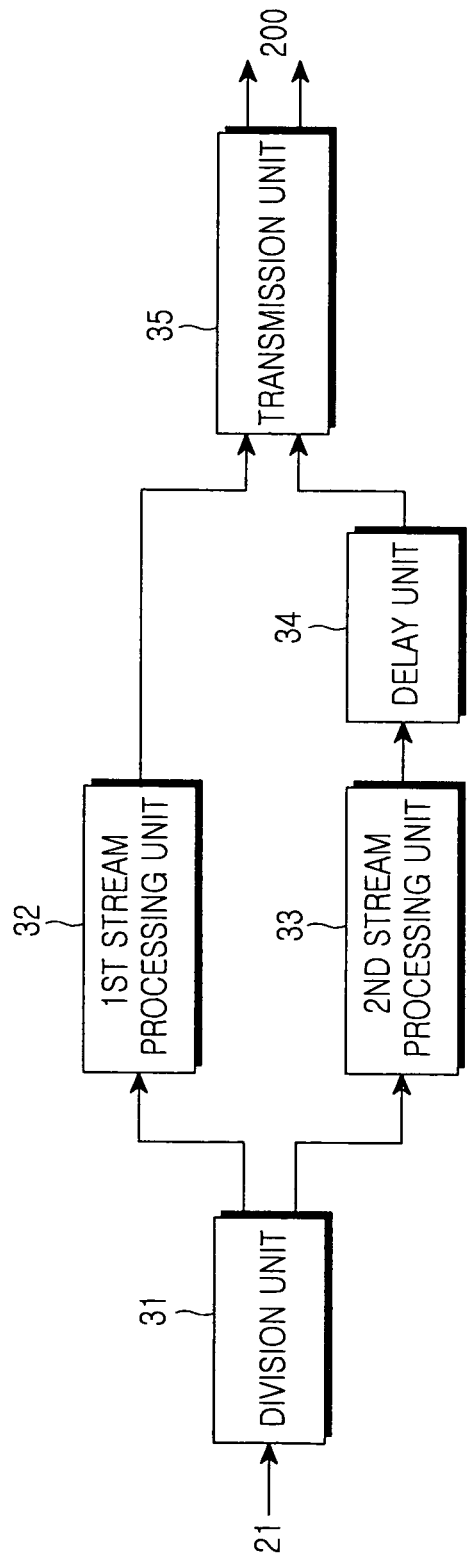
FIGS. 3A and 3B are block diagrams illustrating the construction of the division transmission unit and transmission coupling unit in the digital video stream transmission system employing the SVC scheme according to an embodiment of the present invention.
Figure 3B:
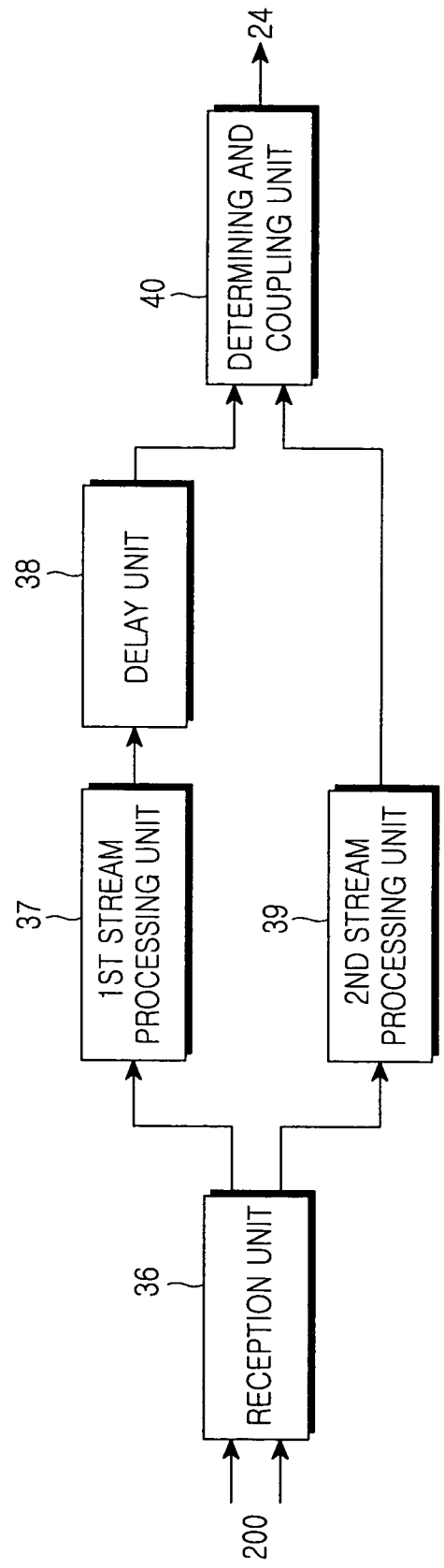

FIGS. 3A and 3B are block diagrams illustrating the construction of the division transmission unit and transmission coupling unit in the digital video stream transmission system employing the SVC scheme according to an embodiment of the present invention.

According to the digital video stream transmission system employing the SVC scheme, the division transmission unit 22 includes a division unit 31, a first stream processing unit 32, a second stream processing unit 33, a delay unit 34, and a transmission unit 35. The division unit 31 receives a high-definition video stream encoded by the encoder 21, and divides the high-definition video stream to reduce a frame rate per second to one-half. The first stream processing unit 32 receives and processes half of the high-definition video stream, which has been divided by the division unit 31. The second stream processing unit 33 receives and processes half of the high-definition video stream, which has been divided by the division unit 31. The delay unit 34 delays the output of the second stream processing unit 33 so that the outputs of the first stream processing unit 32 and second stream processing unit 33 can be transmitted at the same time. The transmission unit 35 transmits divided high-definition video streams, which have been output from the first stream processing unit 32 and delay unit 34, to the wireless environment 200.

As shown in FIG. 3B, according to the digital video stream transmission system employing the SVC scheme, the transmission coupling unit 23 includes a reception unit 36, a first stream processing unit 37, a delay unit 38, a second stream processing unit 39, and a determining and coupling unit 40. The reception unit 36 receives divided high-definition video streams, which have been transmitted through the wireless environment 200. The first stream processing unit 37 receives and processes a non-delayed half of the high-definition video streams which have been received by the reception unit 36. The delay unit 38 delays the output of the first stream processing unit 37 so that the output of the first stream processing unit 37 and the output of the second stream processing unit 39 can be matched. The second stream processing unit 39 receives and processes a delayed half of the high-definition video streams which have been received by the reception unit 36. The determining and coupling unit 40 determines if an error has occurred in each of received high-definition video streams output from the second stream processing unit 39 and the delay unit 38, and couples the high-definition video streams according to the result of the determination.

Figure 4:
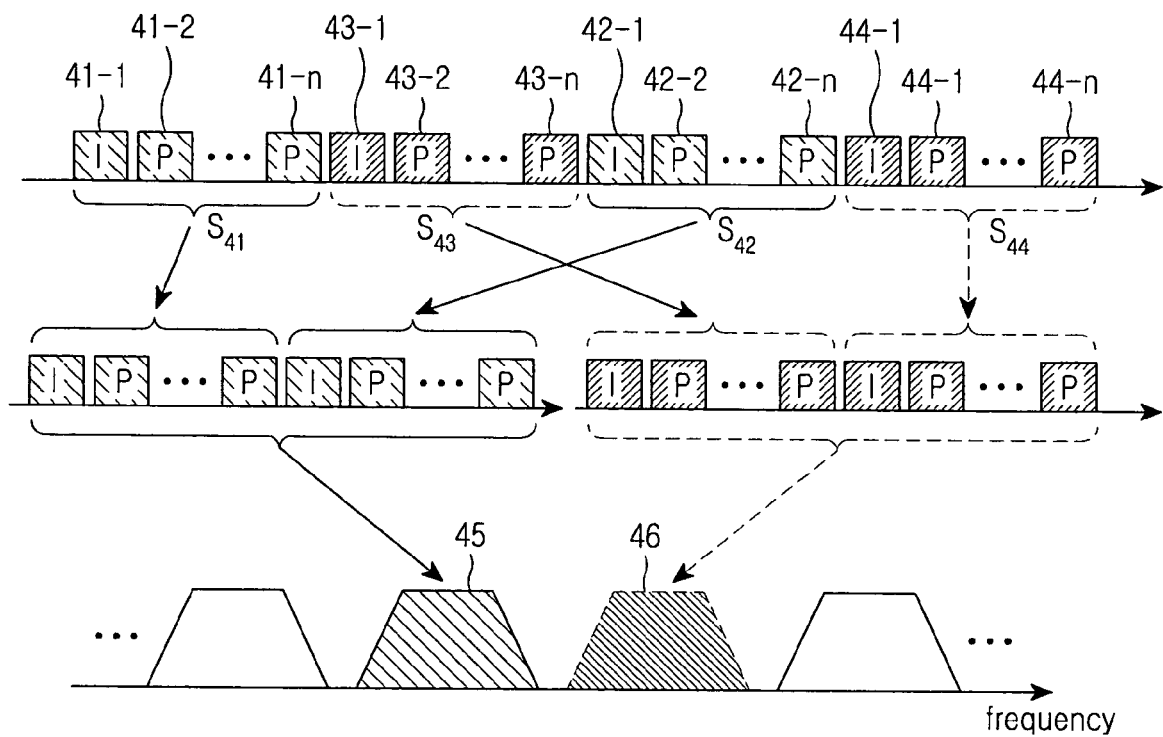
FIG. 4 is a view for explaining a procedure for dividing a stream through the division unit in the digital video stream transmission system employing the SVC scheme according to an embodiment of the present invention.

FIG. 4 illustrates a procedure for dividing a stream through the division unit in the digital video stream transmission system employing the SVC scheme according to an embodiment of the present invention.

Before describing a stream division procedure of the division unit in the digital video stream transmission system employing the SVC scheme, a general high-definition digital video stream will be explained. General high-definition digital video forms pictures at a rate of about 30 frames per second (fps). According to the standard or the definition of the user, a group of pictures (GOP) includes 12 to 16 frames. Bidirectional (B) frames and predicted (P) frames cannot individually restore one entire frame. In other words, since it is necessary to decode one GOP based on correlation between previous and following frames in order to reproduce an entire image, one GOP must include at least one I (Intra) frame and includes B frames and P frames according to the standard or the definition of the user.

For example, assuming a frame rate is 32 fps, a GOP includes 8 frames, and only one I frame exists in a GOP, four I frames 41-1, 42-1, 43-1, and 44-1 exist during one second as shown in FIG. 4. Also, P frames 41-2 to 41-n, 42-2 to 42-n, 43-2 to 43-n, and 44-2 to 44-n are included based on the I frames 41-1, 42-1, 43-1, and 44-1, respectively, in which 'n' is '8' because a GOP includes 8 frames.

Therefore, the division unit 31 performs a switching operation according to GOPs, thereby dividing a high-definition digital video stream into a D1 stream and a D2 stream.

In more detail, the division unit 31 first divides GOPs 41, 42, 43, and 44 so that each GOP may include one I frame and the P frames predicted from the corresponding I frame. In this illustrated case, the division unit 31 binds odd-numbered GOPs 41 and 42 into one bundle, binds even-numbered GOPs 43 and 44 into second bundle, and transmits the bundles through different frequencies 45 and 46. In this case, redundant frequencies are utilized as the different frequencies 45 and 46.

Figure 5A:
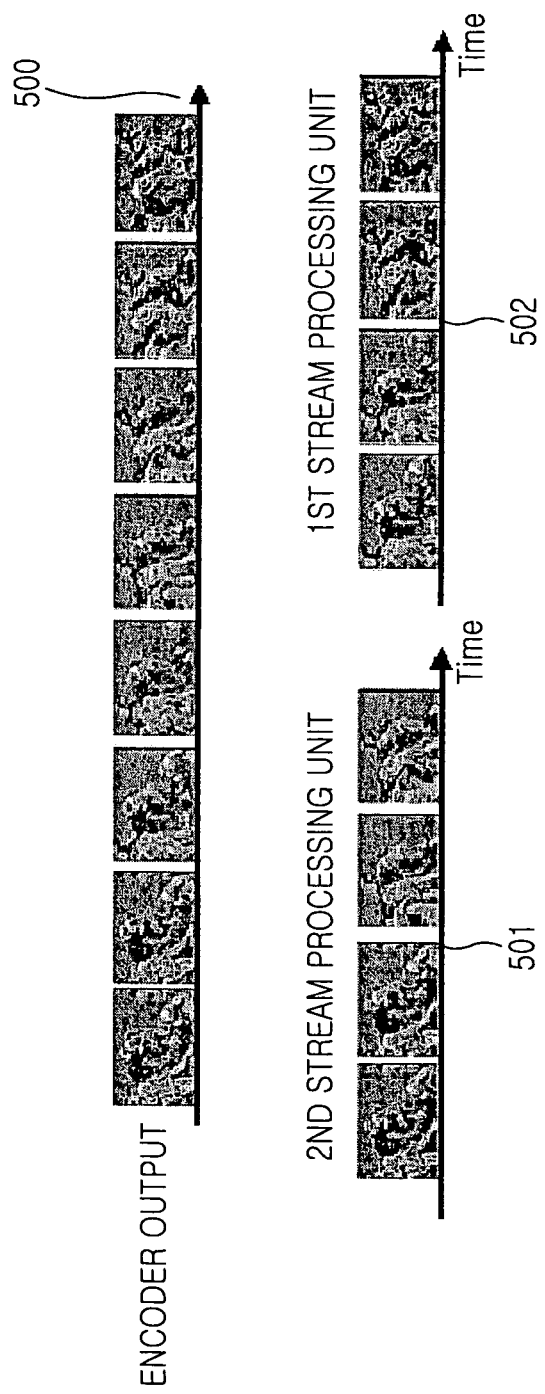
FIGS. 5A and 5B are output images for explaining a stream division and coupling procedure in the digital video stream transmission system employing the SVC scheme according to an embodiment of the present invention.
Figure 5B:
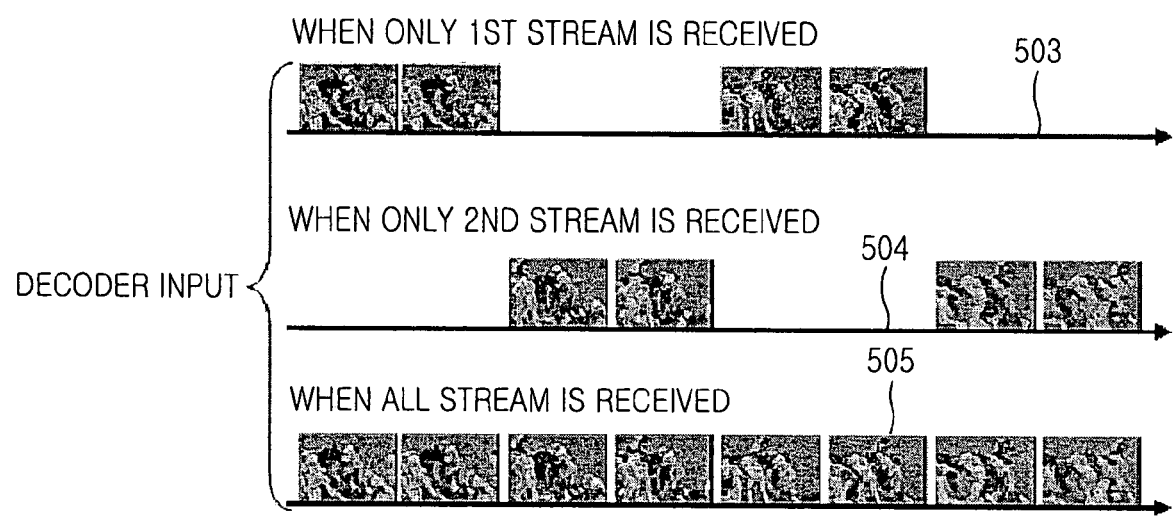

FIGS. 5A and 5B are output images for explaining a stream division and coupling procedure in the digital video stream transmission system employing the SVC scheme according to an embodiment of the present invention.

FIG. 5A is a view illustrating a stream division procedure in the digital video stream transmission system employing the SVC scheme according to an embodiment of the present invention. After dividing images 500 of eight frames, the division transmission unit 22 processes the first, second, fifth, and sixth frames 501 through the second stream processing unit 33, and processes the third, fourth, seventh, and eighth frames 502 through the first stream processing unit 32.

When the frames 501 and 502 have been processed as described above, a time difference occurs between the frames 501 and 502. That is, the first, second, fifth, and sixth frames are processed two frames before the third, fourth, seventh, and eighth frames. Therefore, in order to concurrently transmit the divided frames, the divided image 501 processed through the second stream processing unit 33 is delayed by two frames through the delay unit 34. Herein, a two-frame delay applied by the delay unit 34 is only an example, various delay values may be employed by the delay unit 34.

FIG. 5B is a view illustrating a stream coupling procedure in the digital video stream transmission system employing the SVC scheme according to an embodiment of the present invention. After receiving the divided streams 501 and 502 through the reception unit 36, the transmission coupling unit 23 processes the first, second, fifth, and sixth frames 503 through the second stream processing unit 39, and processes the third, fourth, seventh, and eighth frames 504 through the first stream processing unit 37.

The streams 503 and 504 processed by the stream processing units 37 and 39 are transmitted to the determining and coupling unit 40. In this case, it is necessary to compensate for a delay time, which has been applied in advance in order to transmit the streams. To this end, the delay unit 38 delays the stream 504, which has been processed by the first stream processing unit 37, by two frames which correspond to the delay time applied in order to transmit the streams.

Then, the determining and coupling unit 40 checks if the streams 503 and 504 received from the stream processing units 37 and 39 are valid (i.e. if no error or no loss in the transmitted streams has occurred). When it is determined that all the streams are valid, the determining and coupling unit 40 couples or merges the streams to restore the initial frame rate and transmits the coupled streams to the decoder 24 so that the coupled stream may be decoded based on the SVC scheme according to the present invention. In contrast, when it is determined as a result of the checking that only one stream is valid, the determining and coupling unit 40 transmits only the valid stream to the decoder 24 so that the stream may be decoded based on the SVC scheme according to the present invention.

Herein, an equal delay time must be set at a transmission terminal and a reception terminal, and the value of the delay time must be appropriately determined so as not to be influenced by a burst error occurring in a bursty wireless environment.

Figure 6A:
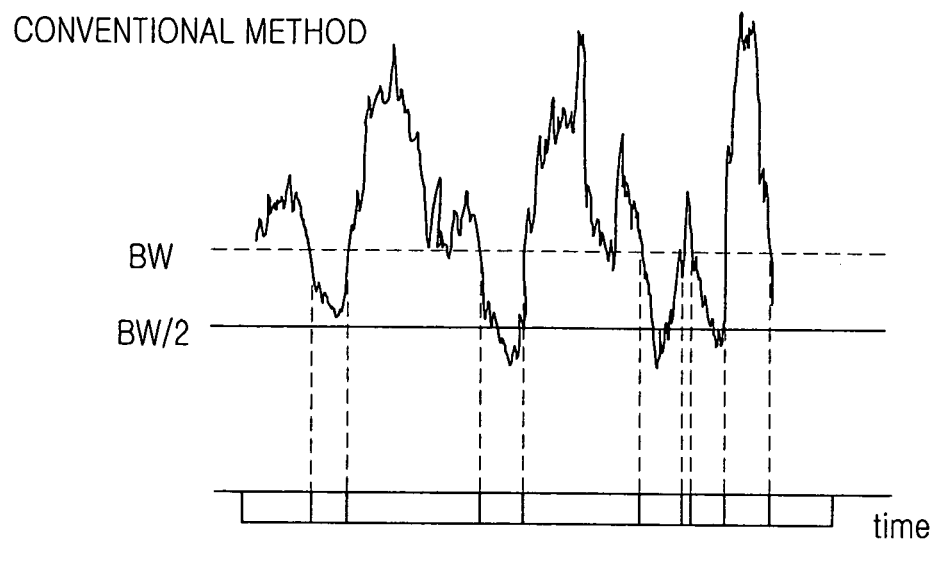
FIGS. 6A and 6B are graphs for explaining the transmission property of the digital video stream transmission system employing the SVC scheme according to an embodiment of the present invention in a bursty wireless environment compared with the transmission property of the conventional transmission system.
Figure 6A:
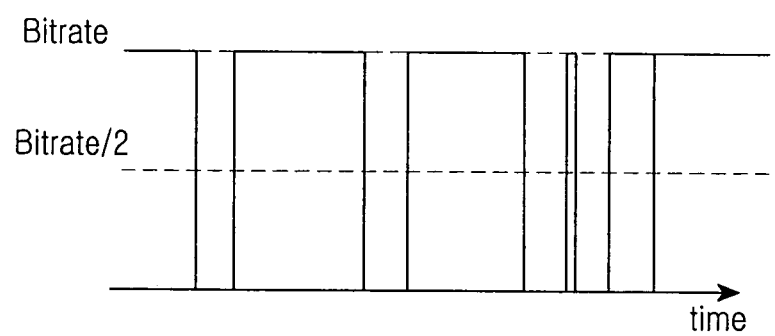
Figure 6B:
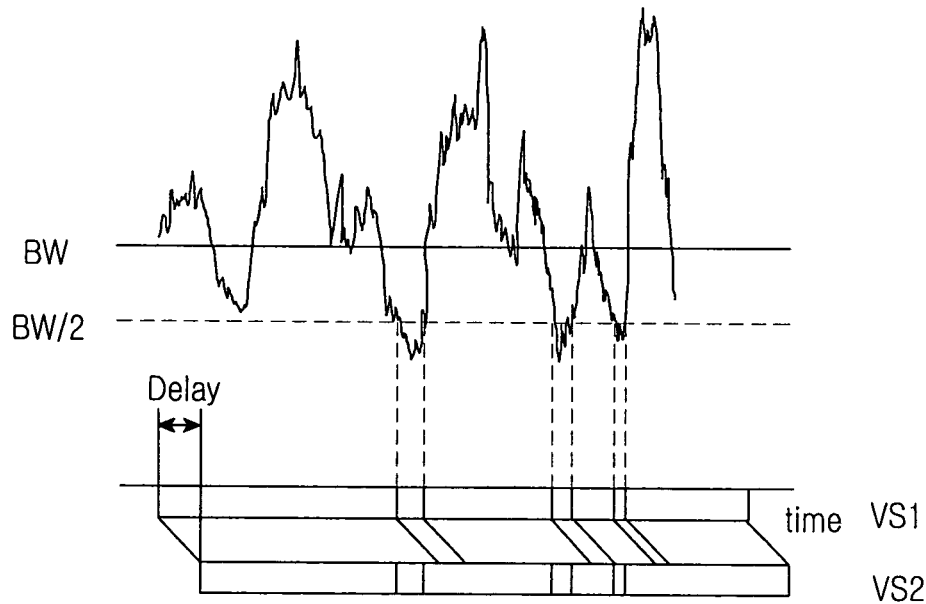
Figure 6B:
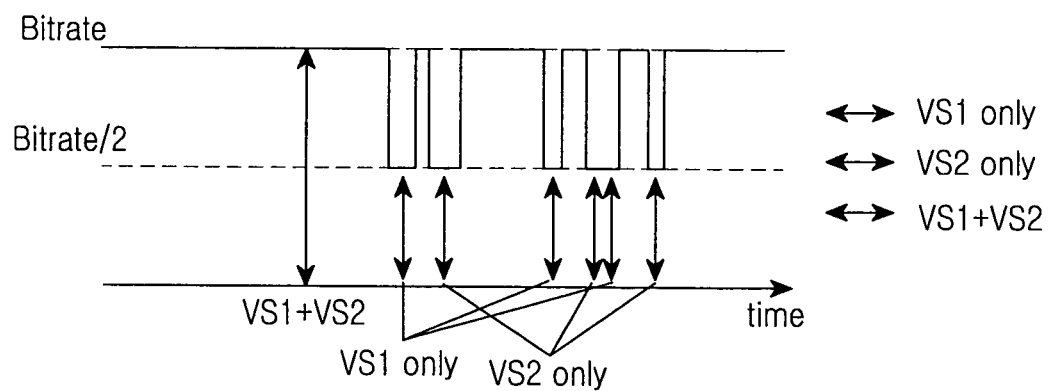

FIGS. 6A and 6B are graphs for explaining the transmission property of the digital video stream transmission system employing the SVC scheme according to an embodiment of the present invention in a bursty wireless environment, as compared with the transmission property of the conventional transmission system.

FIG. 6A is a graph illustrating the transmission property of the conventional transmission system. Referring to FIG. 6A, it can be understood that when a high-definition digital video stream is transmitted, the entire bandwidth and entire bit rate of the stream is used for the transmission, thereby requiring a wide bandwidth corresponding to such a high bit rate.

Errors and/or loss of data may occur during transmission in the wireless environment, so that a specific region of the high-definition digital video stream is lost and the decoding of the stream becomes impossible. This results in a black-out section (i.e. zero bps section).

Referring to FIG. 6B, which is a graph illustrating the transmission property of the digital video stream transmission system employing the SVC scheme according to an embodiment of the present invention, when a high-definition digital video stream is transmitted, a frame rate per channel is reduced to one-half. As half of the entire bandwidth is used for the transmission, n there is a significant reduction in a section in which a loss may occur as compared to a conventional transmission system. Accordingly, the digital video stream transmission system according to the present invention is less influenced by a bandwidth circumstance of the bursty wireless environment as compared with the conventional transmission system.

In addition, according to the present invention, since a predetermined region is divided into two streams and the divided streams are simultaneously transmitted, it is possible to provide an image by the SVC scheme even if only one of the divided streams is received, so that it is possible to prevent a region of the high-definition digital video stream from being blacked out momentarily. That is, according to the digital video stream transmission system of the present invention, it is possible to provide a high-definition digital video stream without interruption although screen quality may be deteriorated due to a bit rate reduced to one-half.

The method according to the present invention can be realized by a program and can be stored in a recording medium (such as a CD ROM, a RAM, a floppy disk, a hard disk, a magneto-optical disk, etc.) in a format that can be read by a computer. Or may be downloaded via an electronic medium and executed by a processor or computer system.

As described above, the digital video stream transmission system according to the present invention can provide a high-definition digital video stream without interruption in a bursty wireless environment.

In addition, the digital video stream transmission system according to the present invention can reduce the required transmission bandwidth.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A system for processing a digital video stream, which supports decoding of a scalable video coding (SVC) scheme, the system comprising:
   an encoder for encoding a high-definition digital video stream; and
   a division transmission unit for:
      dividing the encoded high-definition video stream having a predetermined time unit into two halves thereof comprising a first divided high-definition video stream and a second divided high-definition video stream by selecting and assigning, in an alternating manner, at least one group of pictures (GOP) to the first and second video streams, each GOP including an I frame and a plurality of P frames, wherein each of the first and second divided high-definition video streams has the same number of I frames and the same number of P frames, and each GOP of the first and second divided high-definition video streams has a single I frame and the same number of P frames, and wherein a frame rate of each of the first and second video streams is one-half a frame rate of the encoded high-definition video stream, and
      delaying the second video stream by a known time with respect to the first video stream, said known time corresponding to a number of consecutive at least one group of pictures being selected and assigned to corresponding ones of the first and second video streams, wherein the known time causes the GOPs in corresponding ones of the first and second high-definition video streams to be aligned so as to be transmitted at a same time; and
      transmitting the first and second divided high-definition video streams, wherein said GOPs are transmitted simultaneously using different transmission frequencies for the first and second video streams.

2. The system as claimed in claim 1, wherein the division transmission unit comprises:
   a division unit for receiving the high-definition video stream encoded by the encoder and dividing the high-definition video stream into the first and second divided high-definition video streams;
   a first stream processing unit for receiving and processing the first divided high-definition video stream;
   a second stream processing unit for receiving and processing the second divided high-definition video stream;
   a first delay unit for delaying an output of the second stream processing unit by said known time so as to transmit outputs of the first and second stream processing units at the same time; and
   a transmission unit for transmitting the first and second divided high-definition video streams, which have been output from the first stream processing unit and the first delay unit, respectively, using different transmission frequencies.

3. The system as claimed in claim 1, further comprising a receiving unit that comprises:
   a reception unit for receiving third and fourth divided high-definition video streams, the third video stream being comparable to the transmitted first video stream and the fourth video stream being comparable to the transmitted second video stream;
   a third stream processing unit for receiving and processing the third divided high-definition video stream from the reception unit;
   a second delay unit for delaying an output of the third stream processing unit by the known time;
   a fourth stream processing unit for receiving and processing the fourth divided high-definition video stream;
   a determining and coupling unit for:
      receiving the third and fourth divided high-definition video,
      determining if an error has occurred in the third and fourth divided high-definition video streams, generating a reception high-definition digital video stream by coupling the third and fourth divided high-definition video streams according to a result of the determination, and
      transmitting the reception high-definition digital video stream to a decoder for decoding the reception high-definition digital video stream.

4. The system as claimed in claim 3, wherein the determining and coupling unit:
   receives the third and fourth divided high-definition video streams from the fourth stream processing unit and the second delay unit, respectively;
   determines if an error has occurred in each of the third and the fourth divided high-definition video streams;
   restores a frame rate when there is no error in the third and fourth divided high-definition video streams;
   if there is no error in the third and fourth divided high-definition video streams, generates the reception high-definition digital video stream by coupling the third and fourth divided high-definition video streams, and transmits the reception high-definition digital video stream to the decoder; and
   if there is an error in the third and fourth divided high-definition video streams, generates the reception high-definition digital video stream using only one of the third and fourth divided high-definition video streams not having the error, and transmits the reception high-definition digital video stream to the decoder.

5. The system of claim 1, wherein the number of consecutive GOPs selected and assigned is determined by a channel burst time.

6. The system of claim 1, further comprising:
   a receiving unit for:

receiving the first and second divided high-definition video streams;

determining whether one of the received first and second divided high-definition video streams contains an error; and decoding the at least one of the first and second divided high-definition video streams determined not to contain an error.

7. A method for transmitting a digital video stream, which supports decoding of a scalable video coding (SVC) scheme, the method comprising the steps of:

a) encoding a high-definition digital video stream to generate an encoded video stream including a plurality of consecutively arranged group of pictures (GOP) sets, each GOP set including at least one GOP, each GOP including an I (Intra) Frame and a plurality of P(predicted) frames;

b) dividing the encoded high-definition video stream having a predetermined time unit into two halves thereof comprising a first divided high-definition video stream and a second divided high-definition video stream by selecting and assigning, in an alternating manner, even-numbered GOP sets and odd-numbered GOP sets to the first and the second divided high-definition video streams, respectively, wherein a frame rate of each of the first and second video streams is one-half a frame rate of the encoded high-definition video stream; and c) transmitting the first and second divided high-definition video streams using different transmission frequencies, wherein said GOP sets in said first and second video streams are transmitted simultaneously by delaying one stream with respect to the other by a known time, the known time corresponding to a number of consecutive GOPs associated with the selection and assigning of said GOP sets to corresponding ones of the first and second video streams;

wherein each of the first and second divided high-definition video streams has the same number of I frames and the same number of P frames, and each GOP of the first and second divided high-definition video streams has a single I frame and the same number of P frames.

8. The method as claimed in claim 7, wherein step b) comprises the steps of:

1) receiving the encoded high-definition video stream and dividing the high-definition video stream into the first and second divided high-definition video streams;

2) receiving, processing, and outputting the first divided high-definition video stream;

3) receiving, processing and outputting the second divided high-definition video stream wherein the GOP sets in the first video stream are later in time than the GOP sets in the second video stream; and 4) delaying the second stream output by the known time to cause the even-numbered GOP sets and the odd-numbered GOP sets in the first and second video streams to be transmitted simultaneously.

9. A method for processing a high-definition digital video stream, which supports decoding of a scalable video coding (SVC) scheme, the method comprising the steps of:

receiving first and second divided high-definition video streams transmitted using different transmission frequencies;

determining if an error has occurred in at least one of the first and second divided high-definition video streams;

if there is no error in the first and second divided high-definition video streams, generating a first reception high-definition digital video stream by coupling the first and second divided high-definition video streams, wherein the first reception high-definition digital video stream includes a plurality of consecutively arranged group of pictures (GOP) sets, each GOP set includes at least one GOP, each GOP includes an I (Intra) frame and a plurality of P (predicted) frames, the first divided high-definition video stream including only even-numbered group of pictures (GOP) sets of the first reception high-definition digital video stream, and the second divided high-definition video stream including only odd-numbered group of pictures (GOP) sets of the first reception high-definition digital video stream, and the even-numbered group of pictures (GOP) sets and the odd-numbered GOP sets are alternately disposed in the first reception high-definition digital video stream;

if there is an error in one of the first and second divided high-definition video streams, generating a second reception high-definition digital video stream using only that one of the first and second divided high-definition video streams not having the error;

decoding one of the first and second reception high-definition digital video stream;

wherein each of the first and second divided high-definition video streams has the same number of I frames and the same number of P frames, and each GOP of the first and second divided high-definition video streams has a single I frame and the same number of P frames.

\* \* \* \* \*